United States Patent
Tachibana

[11] Patent Number: 5,908,711
[45] Date of Patent: Jun. 1, 1999

[54] MAGNETIC RECORDING MEDIUM

[75] Inventor: Junichi Tachibana, Miyagi, Japan

[73] Assignee: Sony Corporation, Tokyo, Japan

[21] Appl. No.: 08/876,338

[22] Filed: Jun. 17, 1997

[30] Foreign Application Priority Data

Jun. 18, 1996 [JP] Japan .................................. 8-157117

[51] Int. Cl.$^6$ ...................................................... G11B 5/66
[52] U.S. Cl. .............................. 428/694 T; 428/694 TS;
428/694 TB; 428/694 TP; 428/694 TM;
428/900; 427/128
[58] Field of Search ......................... 428/694 T, 694 TM,
428/694 TS, 694 TB, 694 TP, 900; 427/128

[56] References Cited

U.S. PATENT DOCUMENTS

| | | | |
|---|---|---|---|
| 4,688,130 | 8/1987 | Nakanouchi et al. | 360/135 |
| 4,726,988 | 2/1988 | Oka | 428/307.3 |
| 5,525,398 | 6/1996 | Takai | 428/141 |

*Primary Examiner*—Leszek Kiliman
*Attorney, Agent, or Firm*—Hill & Simpson

[57] ABSTRACT

In a magnetic recording medium having a magnetic thin film formed on a nonmagnetic base film by vacuum evaporation, a noise can be reduced and hence a satisfactory error rate for the digital recording can be secured. A magnetic recording medium according to the present invention includes a nonmagnetic base film, and a magnetic layer formed on the nonmagnetic base film by oblique incident evaporation. A mean particle size a of a column grown on the nonmagnetic base film is set within the range of 10 nm$\leq a \leq$50 nm. A value $\sigma/a$ is set within the range of $\sigma/a \leq 0.4$ where $\sigma$ is a dispersion value of a particle-size distribution of the column.

7 Claims, 5 Drawing Sheets

○ Mean Particle Size of 10nm
△ Mean Particle Size of 30nm
□ Mean Particle Size of 50nm

MAGNETIC RECORDING MEDIUM

BACKGROUND OF THE INVENTION

1. Field of the Invention

The present invention relates to a magnetic recording medium in which a magnetic layer is formed by depositing a metal magnetic thin film on a nonmagnetic base by vacuum evaporation, i.e., oblique incident evaporation.

2. Description of the Related Art

Recently, as an information recording system is shifted from an analog recording system to a digital recording system, a demand for higher density recording of a magnetic recording medium as an information recording means is increased.

In order to realize a higher surface recording density by making a track narrower and making a line recording density higher, it is essential to obtain a higher output and a lower noise of a magnetic recording medium in a short-wavelength region.

An attempt of achieving a higher output of the magnetic recording medium largely depends upon a magnetic energy inherent in a ferromagnetic material forming a magnetic layer, and has reached a technical limit, which makes further improvement thereof difficult.

When a metal thin film is employed for a magnetic layer of the magnetic recording medium, a noise production mechanism lies in a microscopic region (a region of an electronic microscope) such as a crystal structure of a magnetic thin film, a magnetic interaction or the like, an attempt of achieving a lower noise of the magnetic recording medium lies in a field where future technical development is expected.

Specifically, the achievement of the lower noise is the most important technical problem in realization of higher recording density.

In the digital recording, since a noise largely influences an error rate in the form of a S/N ratio, the achievement of a lower noise as well as reduction of a data dropout is an important technical element for securing data reliability.

When a magnetic layer 24 formed of a metal magnetic thin film is formed on a nonmagnetic base 23 by vacuum evaporation, a column (so-called column-shaped crystal) 21 made of an evaporation material or its reactant is grown in a diagonal direction because of a structure of an evaporating apparatus as shown in FIG. 1.

The column 21 has a dense portion 21a and a sparse portion 21b. As the column 21 is grown more, the dense portion 21a becomes larger and a particle size d of the column 21 also becomes longer.

It is generally known that sizes of the column 21 and a crystal particle 22 in the column 21 influence generation of noises. In the magnetic recording medium having the magnetic layer formed of a metal magnetic thin film by evaporation, for achieving a lower noise, it is important to suppress growth of the column 21 and the crystal particle 22.

Which of the size of the column 21 or the crystal particle 22 in the column 21 influences more largely the generation of noises depends upon a wavelength of a recording signal to be used. In the range from 0.3 μm to 1.0 μm which is the shortest recording wavelength of a magnetic recording format which is now used, it is considered that the particle size d of the column 21 has more influence on the generation of the noises.

Since distribution of the particle size d of the column 21 also has influence on the noises, it is important to sharpen a curve shown in FIG. 2 and indicative of the distribution of the column particle diameter as much as possible.

Specifically, as shown in FIG. 2, it is necessary to make dispersion degree of the column particle size d smaller.

SUMMARY OF THE INVENTION

In view of such aspects, it is an object of the present invention to, in a magnetic recording medium having a magnetic thin film formed on a nonmagnetic base film by vacuum evaporation, reduce a noise to thereby secure a satisfactory error rate for the digital recording.

According to an aspect of the invention, a magnetic recording medium includes a nonmagnetic base film, and a magnetic layer formed on the nonmagnetic base film by oblique incident evaporation. A mean particle size a of a column grown on the nonmagnetic base film is set within the range of 10 nm$\leq$a$\leq$50 nm. A value σ/a is set within the range of σ/a$\leq$0.4 where σ is a dispersion value of a particle-size distribution of the column.

DESCRIPTION OF THE PREFERRED EMBODIMENT

A magnetic recording medium according to an embodiment of the present invention will be described with reference to the accompanying drawings.

Figure 3:
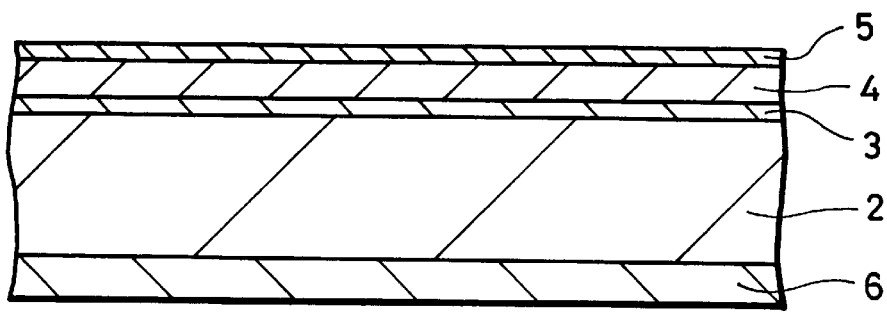
FIG. 3 is a diagram schematically showing a structure of a magnetic recording medium according to an embodiment of the present invention.

As shown in FIG. 3, a magnetic recording medium 1 has a magnetic layer 4 formed on a nonmagnetic base film 2 through a ground layer 3 by evaporation.

In this embodiment, the magnetic recording medium 1 also has the ground layer 3 provided between the nonmagnetic base film 2 and the magnetic layer 4, a protective film 5 formed on a surface of the magnetic layer 4, and a back coating layer 6 provided on a rear side of the nonmagnetic base film 2.

The magnetic layer 4 is formed by depositing a metal magnetic material by oblique incident evaporation. As described above, the magnetic layer 4 has a column 21 and a crystal particle 22 in the column 21 (see FIG. 1).

A polymer base film formed of a polymer material such as polyester group, polyolefin group, cellulose derivative, vinyl system resin, polyimide group, polyamide group, polycarbonate or the like is employed as the nonmagnetic base film 2.

The metal magnetic thin film forming the magnetic layer 4 can be formed by vacuum evaporation.

As a material for the metal magnetic thin film, there can be employed an in-plane magnetization recording metal magnetic film formed of, for example, metal such as Fe, Co, Ni or the like, Co—Ni system alloy, Co—Ni—Pt system alloy, Fe—Co—Ni system alloy, Fe—Ni—B system alloy, Fe—Co—B system alloy, and Fe—Co—Ni—B system alloy, and a vertical magnetization recording metal magnetic thin film such as a Co—Cr system alloy thin film, a Co—O system thin film or the like.

The ground layer 3 is provided to lower roughness of a surface of the nonmagnetic base film 2 to thereby adjust a growth state of the magnetic layer 4 and a surface roughness thereof, and hence can be formed of carbon (C), titanium, chromium or the like.

The protective film 5 is provided to improve durability of the magnetic recording medium 1 and may be made of, for example, carbon (C), $Al_2O_3$, Ti—N, Mo—C, Cr—C, SiO, $SiO_2$, Si—N or the like. However, the material of the protective film 5 is not limited thereto and can be made of other materials. It is not necessary to form this protective film 5, but recently, the protective film 5 is frequently formed on the magnetic layer 4 in order to improve the durability of the magnetic recording medium 1.

The back coating layer 6 is formed on the rear surface of the nonmagnetic base film 2 by using a nonmagnetic pigment such as a carbon or the like.

A structure of the magnetic recording medium according to the present invention is not limited to the above-mentioned structure. If necessity is caused, layers made of a lubricant, a rust inhibitor or the like may be formed without any problem. In this case, known materials can be used for materials contained in a resin binding agent, the lubricant, and the rust inhibitor.

Figure 1:
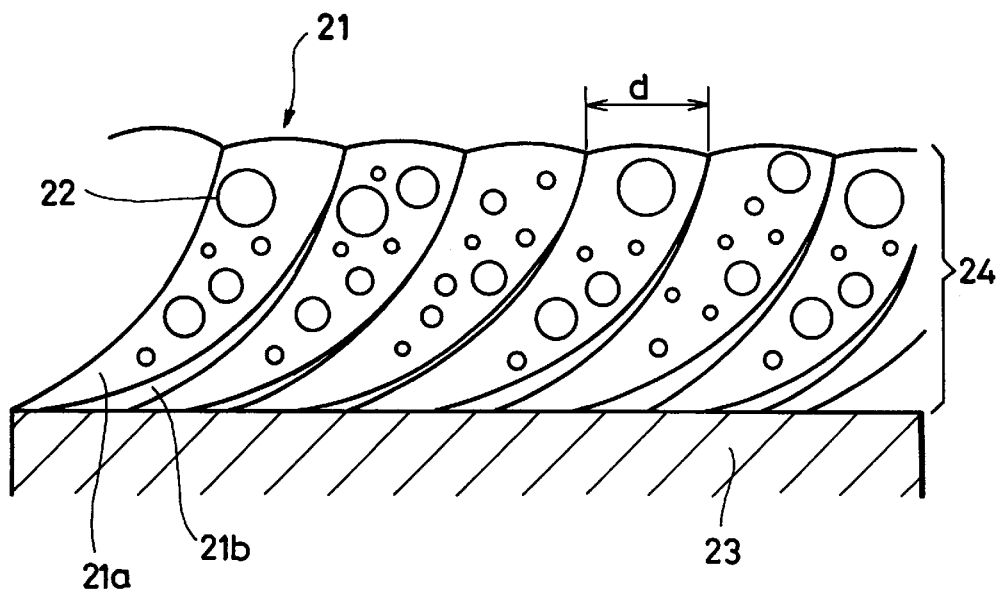
FIG. 1 is a conceptual diagram showing a structure of a column (i.e., a column-shaped crystal)
Figure 2:
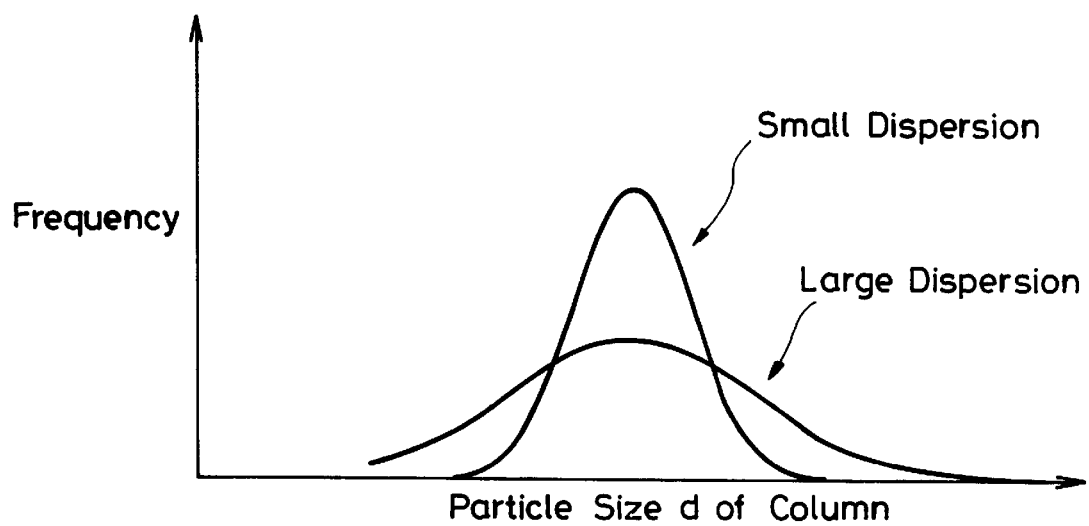
FIG. 2 is a graph used to explain dispersion of a particle size of the column.

The magnetic recording medium 1 having a structure shown in FIG. 1 was practically manufactured and its various characteristics were measured.

INVENTIVE EXAMPLE 1

A polyethylene terephthalate film having a thickness of 6.3 μm was prepared as the nonmagnetic film base 2.

A chromium film having a thickness of 50 nm is formed as the ground layer 3 on the nonmagnetic base film 2 by evaporation.

A magnetic material of Co is deposited on the ground layer 3 by using an electron beam.

Figure 4:
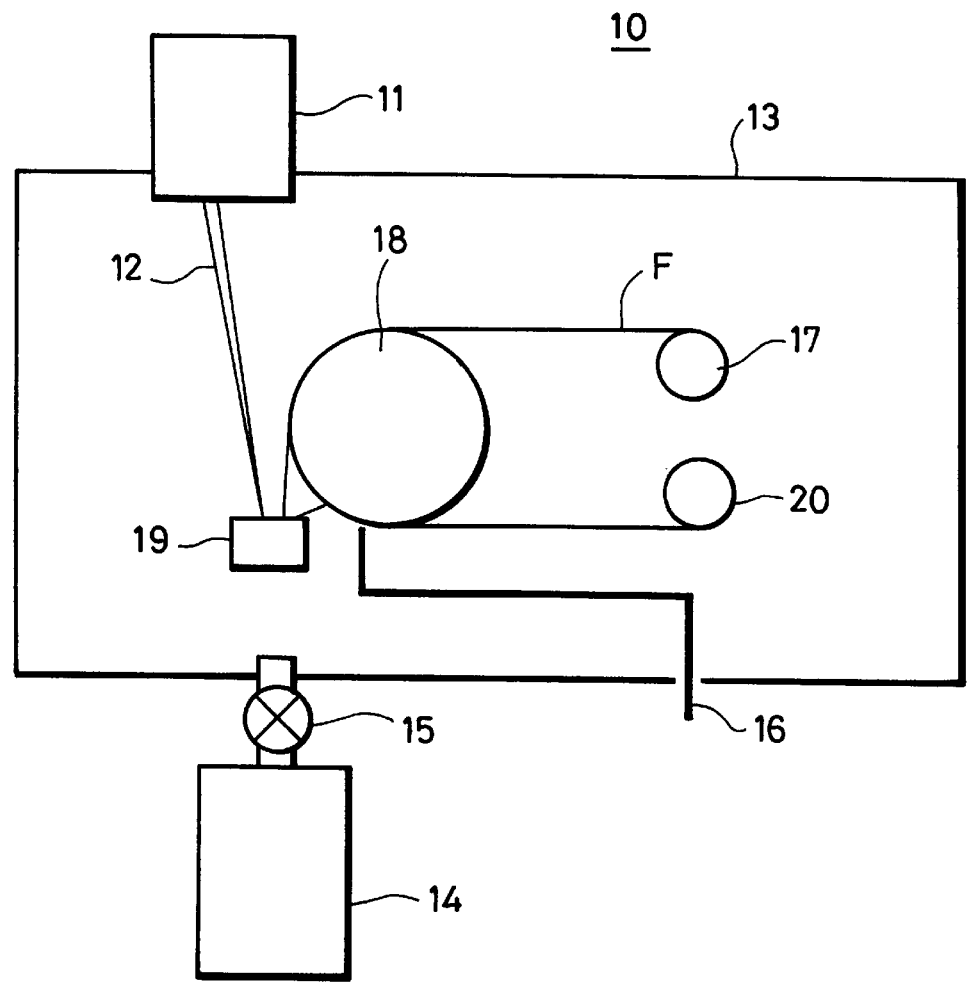
FIG. 4 is a schematic diagram showing an arrangement of an evaporating apparatus used for forming a magnetic layer by evaporation.

FIG. 4 shows an evaporating apparatus used upon the above deposition being performed.

An evaporating apparatus 10 shown in FIG. 4 has at its outer side a chamber 13 for covering the inside thereof. The evaporating apparatus 10 is connected with a vacuum pump 14 having a conductance valve 15 which can reduce an air pressure within the chamber 13.

The evaporating apparatus 10 has an electron beam gun 11 provided on the side opposite to the vacuum pump 14 of the chamber 13. The electron beam gun 11 irradiates electron beams 12 on cobalt in a crucible 19 to evaporate cobalt therein. Thus, oblique incident evaporation of cobalt on the film is carried out.

The evaporating apparatus 10 has, as means for holding and conveying a film as the nonmagnetic base film 2, a supply roll 17, a cooling can 18, and a takeup roll 20. An oxygen gas inlet tube 16 for introducing oxygen from the outside is extended to a position at a downstream side of an evaporation position.

The evaporation apparatus 10 carries out the evaporation as follows.

A film F to be used for the evaporation is set on the supply roll 17. The vacuum pump 14 reduces an air pressure in the evaporation apparatus 10 or the chamber 13. Oxygen gas is introduced through the oxygen gas inlet tube 16.

The film F fed from the supply roll 17 is cooled by the cooling can 18.

The electron beam gun 11 irradiates the electron beam 12 on the crucible 19 to evaporate the magnetic material in the crucible 19. The evaporated magnetic material reaches the surface of the cooled film F and then is solidified and deposited thereon.

The film F on which the evaporation is thus carried out is taken up by the takeup roll 20.

The magnetic layer 4 was formed on the ground layer 3 by evaporating Co by using the evaporating apparatus 10.

The air pressure in the evaporating apparatus 10 was reduced to $10^{-4}$ Pa. A flow amount of oxygen gas was 1.25 l/minute. A temperature of the cooling can 18 was −40°. A power of the electron beam gun 11 was 30 kW.

The magnetic layer 4 having a thickness of 0.05 μm was formed by one evaporation process. This evaporation process was repeatedly carried out four times to form the magnetic layer 4 having four-layer structure with its total thickness of 0.2 μm. An incident angle of the evaporated magnetic material upon the evaporation process was within the range from 50° to 90° every time.

Then, the protective film 5 made of carbon was formed by sputtering so as to have a thickness of about 10 nm. The rear surface of the nonmagnetic base film 2 was subjected to a back coating processing to form the back coating layer 6.

A lubricant of perfluoro ether system was coated on the surface of the layer.

Lastly, the nonmagnetic base film 2 thus processed was cut and divided so that each of divided portions should have had a width of 6.35 mm. Thus, the magnetic recording medium 1 was formed.

A particle size of the column 21 of the magnetic recording medium 1 formed as described above was measured.

Figure 5:
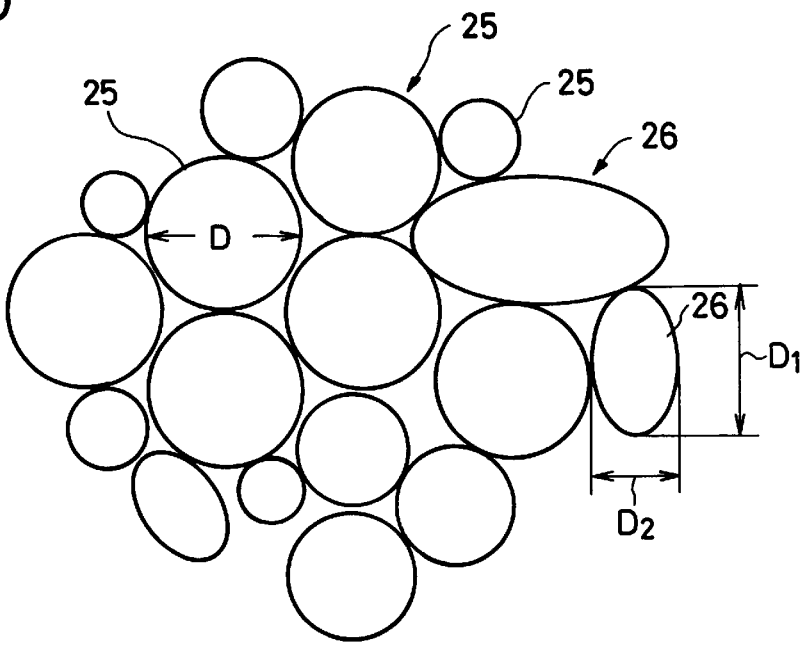
FIG. 5 is a diagram showing a state of columns of the magnetic recording medium, seen from an upper side of the magnetic recording medium.

FIG. 5 is a diagram obtained when the columns 21 were observed by using a scanning electronic microscope (SEM). As shown in FIG. 5, in a case of a circular column 25 having a circular shape, its diameter D was defined as a particle size d of that column. In a case of an elliptical column 26 having an elliptical shape, a mean value of its long diameter $D_1$ and its short diameter $D_2$ was defined as a particle size d of that column.

Figure 6:
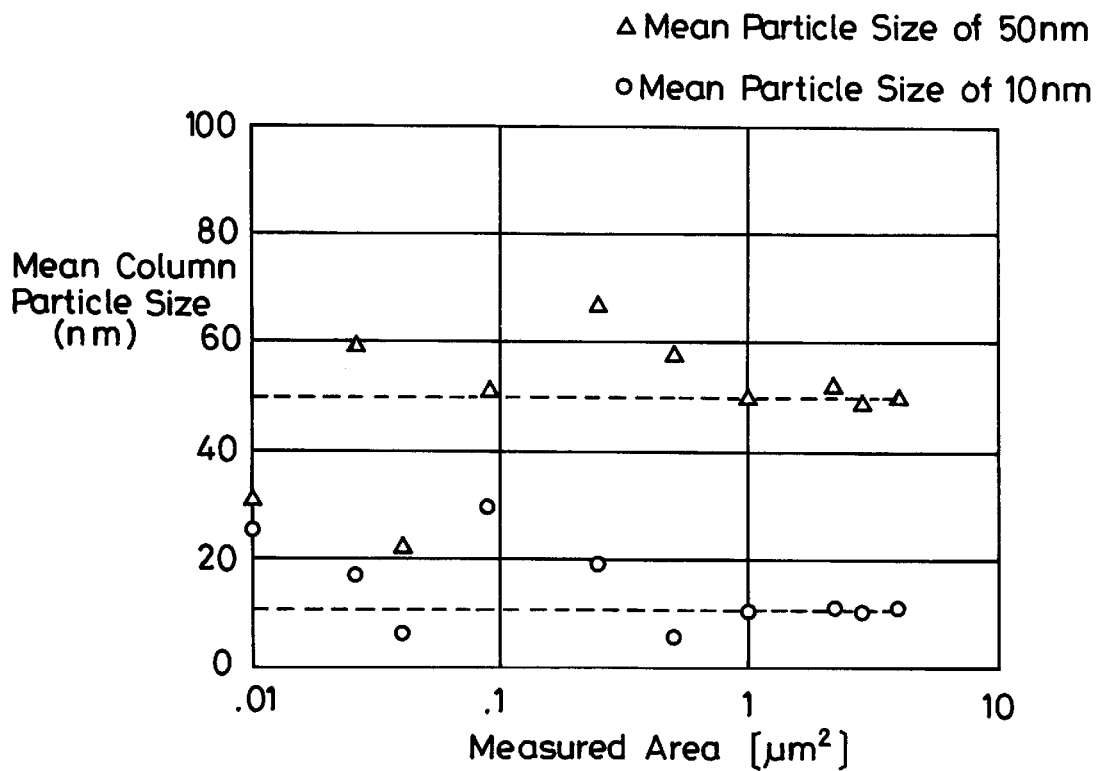
FIG. 6 is a graph showing a relationship between an area of a measurement region of the column and a mean particle size of the column.

As shown in FIG. 6 which is a graph showing correlation between an area of a measurement range and distribution of a measured mean particle size of a column, when the measurement of the particle size was carried out in the range narrower than 1.0 μm², the measured values were dispersed. Therefore, the area of the measurement range was set to 1.0 μm².

The particle sizes d of all the columns in the measurement range were measured to calculate a mean particle size a and a dispersion value σ therefrom.

Since the magnetic layer 4 was formed so as to have a four-layer structure, there was obtained the magnetic recording medium 1 having the mean particle size a of its columns 21 within the range of 10 nm≦a≦30 nm and the dispersion value σ of the particle size distribution of the columns 21 within the range of σ/a≦0.4.

COMPARATIVE EXAMPLE 1

A magnetic recording medium 1 of the comparative example 1 was formed similarly to that of the inventive example 1 except that the evaporation of the magnetic material was carried out twice to form the magnetic layer 4 having a bilayer structure with its total thickness of 0.2 μm.

Since the magnetic layer 4 was formed so as to have a bilayer structure, there was obtained the magnetic recording medium 1 having the mean particle size a of its columns 21 within the range of 80 nm≦a≦110 nm and the dispersion value σ of the particle size distribution of the columns 21 within the range of σ/a≦0.4.

COMPARATIVE EXAMPLE 2

A magnetic layer 4 was formed directly on a nonmagnetic film base 2 similar to that used in the inventive example 1 by evaporation without a ground layer being provided therebetween.

A magnetic layer 4 having a single-layer structure was formed by using the evaporating apparatus 10 shown in FIG. 4 under the conditions that the flow amount of oxygen gas upon the evaporation was set to 0.90 l/minute and cobalt was evaporated once so that the thickness of the magnetic layer 4 should have been 0.2 μm.

A magnetic recording medium according to the comparative example 2 was formed under the same evaporation conditions similar to the inventive example 1 except the above conditions.

In this case, there was obtained the magnetic recording medium 1 having the mean particle size a of its columns 21 within the range of 160 nm≦a≦180 nm and the dispersion value σ of the particle size distribution of the columns 21 within the range of σ/a=0.4.

A plurality of samples of the magnetic recording medium according to the inventive example 1 and the comparative examples 1 and 2 were prepared. A noise level and a random error rate were measured by using these samples and samples manufactured under other conditions.

The noise levels of the samples of the magnetic recording media were measured by measuring, by using a commercially available spectrum analyzer manufactured by Hewlett Packard Co. under the trade name of 3585B, RF signal outputs thereof from a commercially available digital video camera manufactured by Sony Co. under the trade name of DVC-1000.

Figure 7:
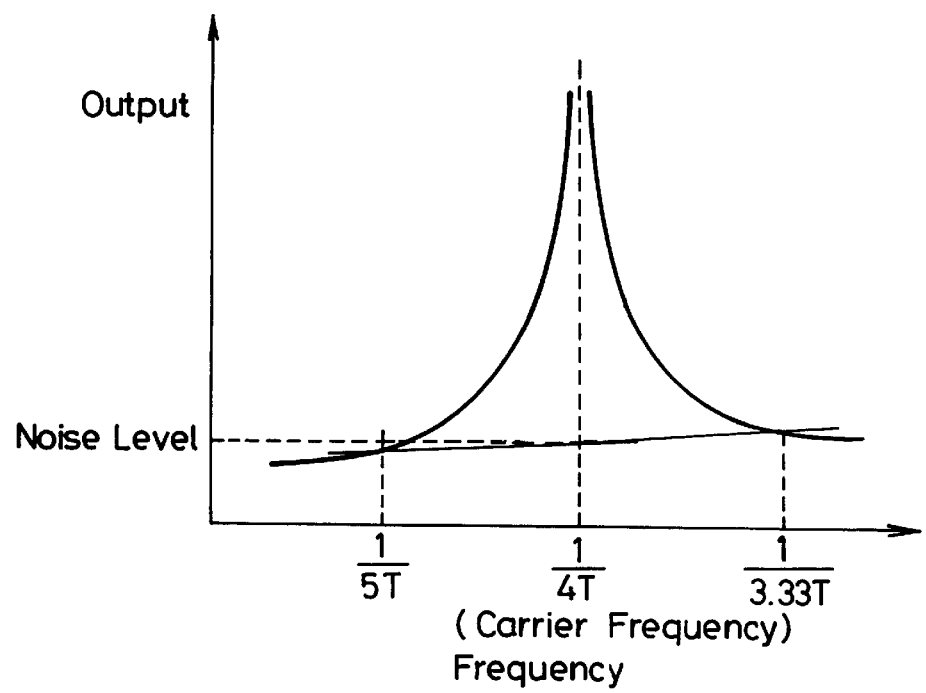
FIG. 7 is a graph used to explain definition of a noise level.

The noise level is a so-called medium noise. As shown in FIG. 7, a mean value of noise levels at frequencies of 1/(3.33T) and 1/(5T) in a spectrum obtained when a rectangular wave of a carrier frequency of 1/(4T) (a recording wavelength of 1.0 μm) was recorded was employed as the noise level.

The carrier frequency of 1/(4T) is a frequency having the largest influence on an error rate in a consumer-purpose digital video tape recorder employing a scrambled non-return-to-zero-interleaved (NRZI) recording as a modulation system.

The random error rate was measured by measuring, by using an original error rate measuring machine, a signal from the commercially available digital video camera manufactured by Sony Co. under the trade name of DVC-1000.

Since a limit of an error correction is about $1.0 \times 10^{-3}$, it is desirable in consideration of a margin that an error rate does not exceed $1.0 \times 10^{-4}$.

Figure 8:
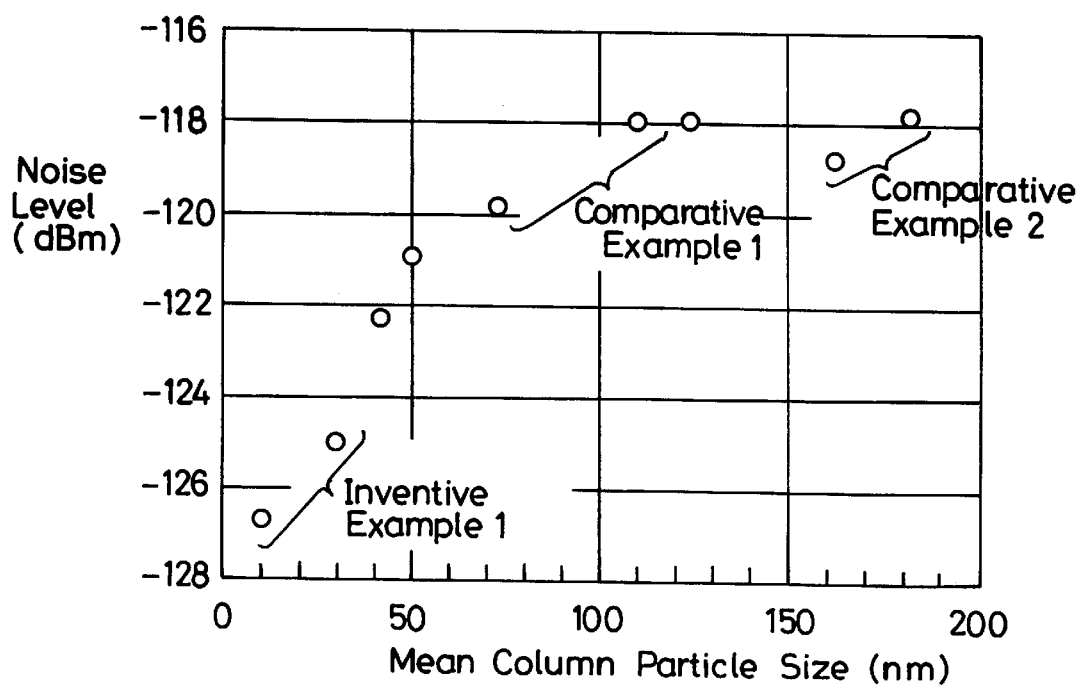
FIG. 8 is a graph showing a relationship between the mean particle size of the column and the noise level.

FIG. 8 shows a relationship between the particle size of the column and the noise level obtained by the measurement.

Study of FIG. 8 reveals that as the mean particle size of the column becomes larger, the noise level becomes higher.

Figure 9:
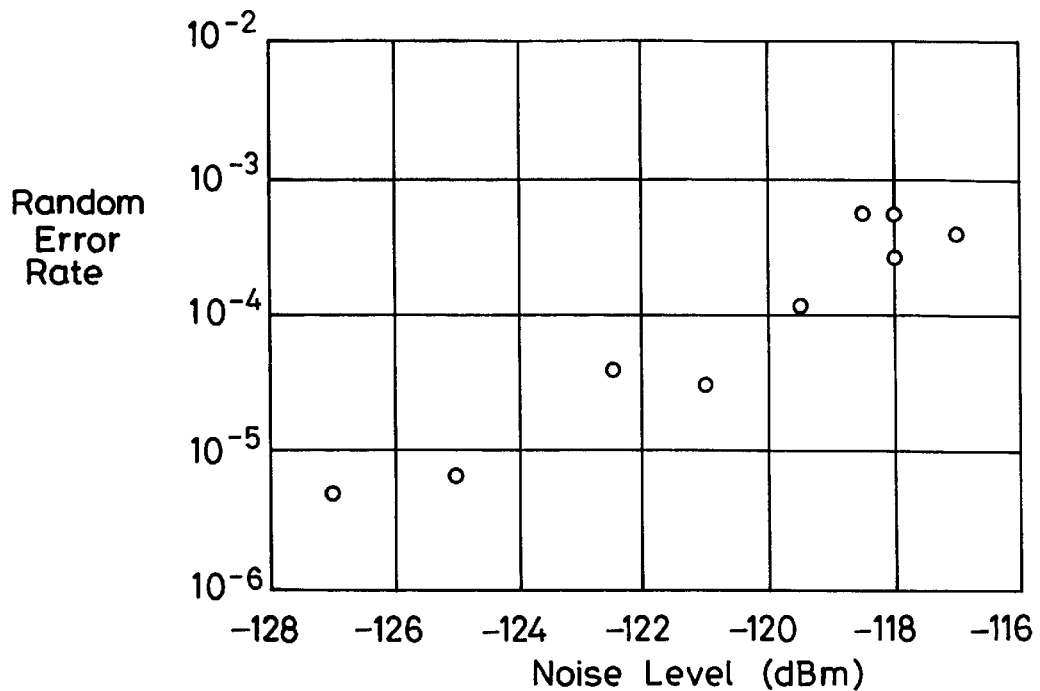
FIG. 9 is a graph showing a relationship between the noise level and a random error rate.

FIG. 9 shows a relationship between the noise level and the error rate.

Study of FIG. 9 reveals that as the noise level becomes higher, the random error rate becomes more aggravated and that if the random noise rate exceeds −120 dBm, then the random error rate exceeds $1.0 \times 10^{-4}$. Since an output obtained at a frequency of 1/(4T) was within the range of ±0.3 dB in each of the samples, it can be judged that the change of the random error rate depends on the change of the noise level.

Study of FIG. 8 reveals that if the mean particle size a of the column exceeds 50 nm, then the error rate becomes more aggravated as the noise level becomes higher and hence that if the mean particle size a of the column is set equal to or smaller than 50 nm, then it is possible to set the error rate equal to or smaller than $1.0 \times 10^{-4}$.

On the other hand, since the size of the crystal particles in the column is of an order of several nm, if the particle size of the column becomes smaller than the size of the crystal particle, the column becomes a superparamagnetism region and hence loses a magnetism. Therefore, it is necessary to set the mean particle size of the column equal to or larger than 10 nm.

The results of the measurements reveal that when the mean particle size a of the column is set within the range of 10 nm≦a≦50 nm, it is possible to secure the satisfactory random error rate of $1.0 \times 10^{-4}$ or smaller.

Figure 10:
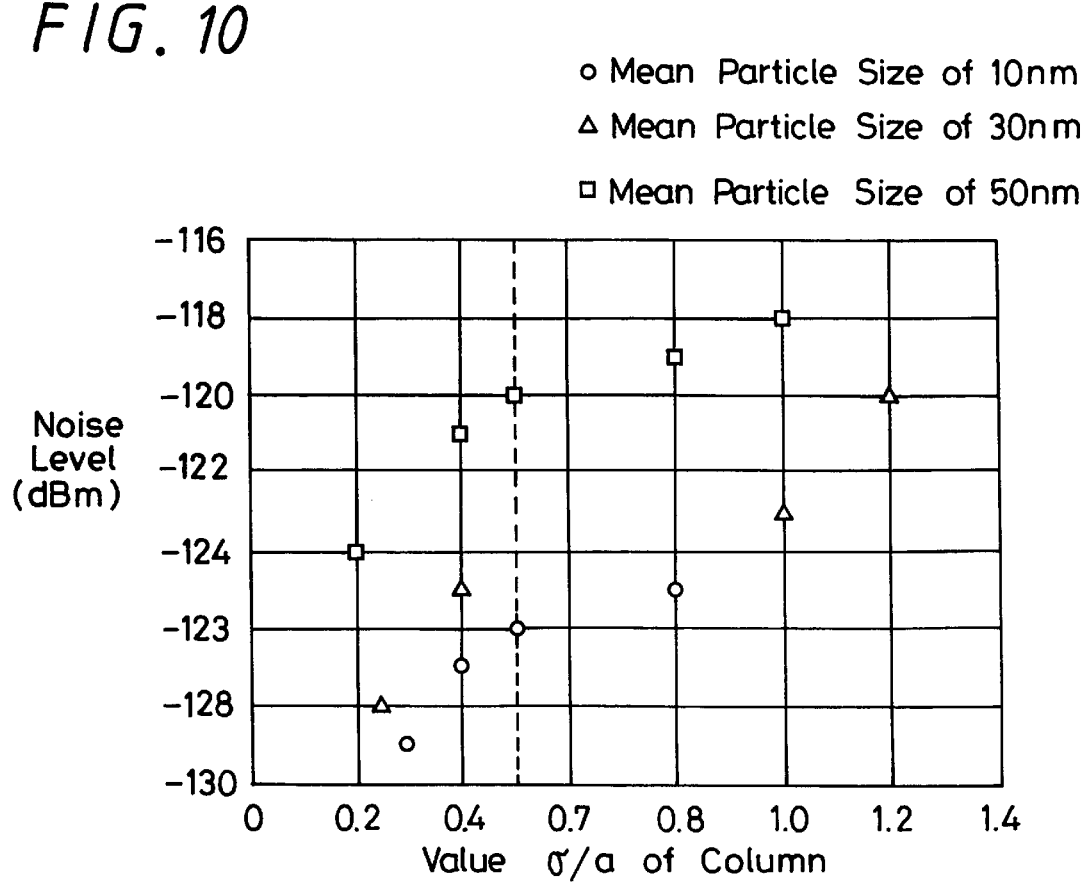
FIG. 10 is a graph showing a relationship between a value σ/a of the column and the noise level.

FIG. 10 shows a relationship between the noise level and a value σ/a obtained by dividing by the mean particle size a the dispersion value σ of the particle size distribution of the samples having the mean particle sizes a of the columns of 10 nm, 20 nm, and 50 nm.

Study of FIG. 10 reveals that, in each of the samples, as the value σ/a becomes larger, i.e., as the particle sizes a become more dispersed and hence the particle-size distribution becomes wider, the noise level becomes higher.

In a case of the sample having the mean particle size a of 50 nm, if the value σ/a exceeds 0.4, the noise level reaches −120 dBm at which the random error rate exceeds $1.0 \times 10^{-4}$.

Therefore, if the mean particle size a of the column is about 50 nm, it is possible to set the error rate to $1.0 \times 10^{-4}$ or smaller by setting the value σ/a to 0.4 or smaller.

As described above, since the mean particle size a of the columns grown on the nonmagnetic base film is set within the range of 10 nm≦a≦50 nm and the value σ/a obtained by dividing the dispersion value σ of the particle-size distribution of the columns is set within the range of σ/a≦0.4, a lower noise is achieved in the short wavelength region of 1.0 μm or smaller and hence it is possible to secure the satisfactory error rate of $1.0 \times 10^{-4}$ in the digital signal recording.

Specifically, application of the magnetic recording medium having the structure according to this embodiment allows the magnetic recording medium having the satisfactory error rate which is suitable for use as the magnetic recording medium for use in the recording and reproduction of the digital signal where the satisfactory error rate is required particularly.

While in the above embodiment the magnetic recording medium has the ground layer, the back coating layer and the protective layer, even if the magnetic recording medium has any of or all of the above layers, the same effect as that of the present invention can be achieved.

According to the magnetic recording medium of the present invention, the mean particle size a of the columns grown on the nonmagnetic base film is set within the range of $10\text{ nm} \leq a \leq 50\text{ nm}$ and the value $\sigma/a$ obtained by dividing the dispersion value $\sigma$ of the particle-size distribution of the columns is set within the range of $\sigma/a \leq 0.4$. Therefore, it is possible to achieve a lower noise in the short wavelength region of $1.0\ \mu m$ or smaller.

Since it is possible to secure the satisfactory error rate of $1.0 \times 10^{-4}$, it is possible to form the magnetic recording medium suitable for use in the recording and reproduction of the digital signal recording particularly.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A magnetic recording medium comprising:

a nonmagnetic base film; and a magnetic layer formed on said nonmagnetic base film by oblique incident evaporation, said magnetic layer comprising a magnetic metal thin film comprising a plurality of columns including crystalline particles, each column having a diametrical dimension, said magnetic layer being grown on said nonmagnetic base film so that said plurality of columns has a mean diametrical dimension, a, such that $10\text{ nm} \leq a \leq 50\text{ nm}$, and said plurality of columns has a dispersion value $\sigma$ of said diametrical dimensions, such that $\sigma/a \leq 0.4$.

2. A magnetic recording medium according to claim 1, wherein said magnetic recording medium is used for recording and reproducing a digital signal.

3. A magnetic recording medium as defined in claim 1, wherein said magnetic layer comprises a metal selected from the group consisting of Fe, Co, and Ni, or an alloy selected from the group consisting of Co—Ni system alloys, Co—Ni—Pt system alloys, Fe—Co—Ni system alloys, Fe—Ni—B system alloys, Fe—Co—B system alloys and Fe—Co—Ni—B system alloys.

4. A magnetic recording medium as defined in claim 1, further comprising a ground layer disposed between the nonmagnetic base film and the magnetic layer.

5. A magnetic recording medium as defined in claim 1, further comprising a protective film disposed on said magnetic layer.

6. A magnetic recording medium as defined in claim 1, further comprising a back coat layer disposed on a surface of the nonmagnetic base film opposite said magnetic layer.

7. A magnetic recording medium as defined in claim 1, wherein said magnetic layer comprises a plurality of layers formed one after another by oblique incident evaporation.

* * * * *